United States Patent [19]

Bagley

[11] 3,905,743

[45] Sept. 16, 1975

[54] EXTRUSION APPARATUS FOR FORMING THIN-WALLED HONEYCOMB STRUCTURES

[75] Inventor: Rodney D. Bagley, Corning, N.Y.

[73] Assignee: Corning Glass Works, Corning, N.Y.

[22] Filed: July 27, 1973

[21] Appl. No.: 383,388

Related U.S. Application Data

[62] Division of Ser. No. 196,986, Nov. 9, 1971, Pat. No. 3,790,654.

[52] U.S. Cl. ............... 425/464; 425/382; 425/467
[51] Int. Cl.² ........................................... B29F 3/04
[58] Field of Search ......... 264/176 F, 177 R, 177 F; 425/131, 461, 467, 462, 463, 465, 466, 464, 67, 71, 72, DIG. 217, 382

[56] References Cited
UNITED STATES PATENTS

| | | | |
|---|---|---|---|
| 3,038,202 | 6/1962 | Harkenrider | 425/464 |
| 3,406,230 | 10/1968 | Baxter et al. | 264/177 R X |
| 3,406,427 | 10/1968 | Tsuji | 425/131 |
| 3,553,776 | 1/1971 | Romagano et al. | 425/378 X |
| 3,762,854 | 10/1973 | Kilsdonk | 425/464 X |
| 3,767,353 | 10/1973 | Gaffney | 425/131 X |

Primary Examiner—Robert D. Baldwin
Assistant Examiner—Mark Rosenbaum
Attorney, Agent, or Firm—Burton R. Turner; Clarence R. Patty, Jr.

[57] ABSTRACT

Apparatus for forming thin-walled honeycomb structures is provided in the form of an extrusion die having an outlet face provided with a gridwork of interconnected discharge slots and an inlet face provided with a plurality of feed openings extending partially through said die in communication with said discharge slots. Extrudable material is fed to said die under pressure wherein the extrudable material flows longitudinally through the feed openings in the inlet face of the die and is directed thereby to the interconnected discharge slots communicating with the outlet face, wherein a portion of the material flows laterally within such slots to form a continuous mass before being discharged longitudinally therefrom to thereby form a thin-walled structure having a multiplicity of open passages extending therethrough.

3 Claims, 9 Drawing Figures

EXTRUSION APPARATUS FOR FORMING THIN-WALLED HONEYCOMB STRUCTURES

This is a division of application Ser. No. 196,986, filed Nov. 9, 1971, now, U.S. Pat. No. 3,790,654.

BACKGROUND OF THE INVENTION

This invention pertains to the art of manufacturing thin-walled honeycomb structures from extrudable material such as ceramic batches, molten glasses, plastics, molten metals, and similar materials which have the property of being able to flow or plastically deform during extrusion while being able to become sufficiently rigid immediately thereafter so as to maintain structural integrity. More particularly, the present invention relates to an improved extrusion die structure and method for forming uniform thin-walled cellular or honeycomb type articles having a plurality of openings or passages extending therethrough with wall portions between such openings having a preferred thickness of between about 0.002 and 0.050, so as to provide open frontal areas of about 75% or greater.

As pointed out by the prior art in U.S. Pat. No. 3,112,184, it has been known to make thin-walled ceramic honeycomb structures for use in regenerators, recuperators, radiators, catalyst carriers, filters, heat exchangers, and the like by coating a carrier with a ceramic slurry and binder mix and flowing crimped and flat sheets of such coated carrier together to make a cellular type structure. Although suitable products may be formed in this manner, the prior art technique has not been completely satisfactory due to the fact that cell shape is limited and wall thicknesses may not be uniform, and further the process is relatively slow and requires costly materials.

A further U.S. prior art Pat. No. 3,406,435 discloses apparatus for manufacturing ceramic elements having a honeycomb structure wherein a plurality of elongated thin-walled sleeve members having extensions with closed end portions are connected to an extruder cylinder. The material to be extruded is forced through the elongated sleeve members and outwardly through orifices formed in side walls of the extensions attached thereto. The sleeve extensions are spaced from each other to provide channels in which the material from the orifices become reshaped into a honeycomb structure.

Although the structure of U.S. Pat. No. 3,406,435 appears to overcome some of the problems associated with a typical die assembly such as shown in U.S. Pat. No. 1,849,431 wherein a spider or cross-head positions a plurality of rods, one for each core or cell in the article to be formed; the apparatus is not completely satisfactory for producing honeycomb structures having a multiplicity of sized cells or openings, since not only would it be virtually impossible to construct due to the number of sleeves required, but also the unsupported extensions on such sleeves would have a tendency to distort under extrusion pressures. In addition, as shown in the patent drawings, truly thin-walled structures are not obtainable with such a structure. Further, any variation in the spaces between the extensions will tend to result in a curved extrusion or rippling of the formed article, since a thicker section of the wall will extrude more rapidly than a thin section.

Accordingly, the present invention has overcome the problem of suspending a plurality of core members in predetermined spaced apart relationship, which has plagued the prior art, by providing a completely unique manner of forming an extrusion die with uniform discharge slots which are maintained in substantially rigid orientation during extrusion.

SUMMARY OF THE INVENTION

In its very simplest form, the present invention is directed to an improved extrusion die structure for forming thin-walled cellular or honeycomb structures and to the method of forming such structures. Cellular or honeycomb structures refer to any structure having a plurality of openings or passages of any desired size or shape extending therethrough, whereas thin walls refers to the walls between such openings or passages having a thickness of between about 0.002 and 0.050. The extrusion die per se, is preferably made of a unitary construction having a plurality of interconnected discharge slots provided with uniform openings in the outlet face of the die. The discharge slots may either be uniformly spaced-apart or formed with variable spacing therebetween if desired, and the gridwork formed in the outlet face by such slots may be of virtually any geometric pattern such as square, rectangular, triangular, hexagonal and circular. A plurality of feed openings or passageways communicate between the inlet face of the die and inner root portions of the discharge slots to deliver extrudable material from an extrusion chamber to the discharge slots. The feed passageways may be in the form of slots or holes which intersect selected portions of the gridwork formed by the interconnecting discharge slots.

The discharge slots, which are of a predetermined size and orientation to form a desired thin-walled structure, extend inwardly from the outlet face a distance sufficient to insure the lateral filling of all outlet portions of such slots with the extrudable material delivered thereto by the feed holes, prior to such material being discharged from the die. In order to facilitate such lateral flow of batch material within the discharge slots so as to provide a coherent mass of such material within the gridwork formed by the interconnected discharge slots, the discharge slots are preferably formed with a greater resistance to batch flow than that provided by the feed passageways. However, the resistance to flow in the slots need not necessarily be greater than that in the feed passageways, but must be sufficient to insure that the batch material will flow laterally together within the depth of the discharge slots and prior to discharge therefrom so as to form a continuous mass of interconnected batch prior to such discharge. Further, the root portions of such discharge slots may be contoured to provide ease in lateral flow.

Although the die body is preferably produced as a unitary construction so as to provide the required strength and rigidity to withstand extrusion pressures without failure or deliterious deformation, the body per se may be formed either from a single piece of material or from a plurality of pre-formed sheets which are subsequently fused or bonded together to form a unitary body. However, where the extrusion pressures are not excessive, such sheets may merely be clamped together. A collar member may be provided about the die body to form a bounding passage about the periphery of the outlet face, so as to provide for an integral shell about the honeycomb structure. A plurality of longitudinally-extending feed openings are formed in the die assembly to feed batch material to the annular passage, and restriction means may be provided to vary the resistance to flow through such passage.

It thus has been an object of the present invention to provide a novel relatively easily manufacturable extrusion die structure for forming thin-walled honeycomb articles having a plurality of openings per cross-sectional area, wherein said die structure is substantially rigid so to maintain dimensional stability during extrusion and thereby provide uniform thin walls between such openings.

A further object of the invention has been to provide an improved method of forming thin-walled honeycomb articles by delivering extrudable material longitudinally through feed passages to a plurality of interconnected discharge slots forming a gridwork, impeding the flow through such slots and laterally flowing a portion of the material delivered to such slots to form a unitary grid-like mass, then longitudinally discharging said mass to form a honeycomb structure.

DESCRIPTION OF THE PREFERRED EMBODIMENTS

Figure 1:
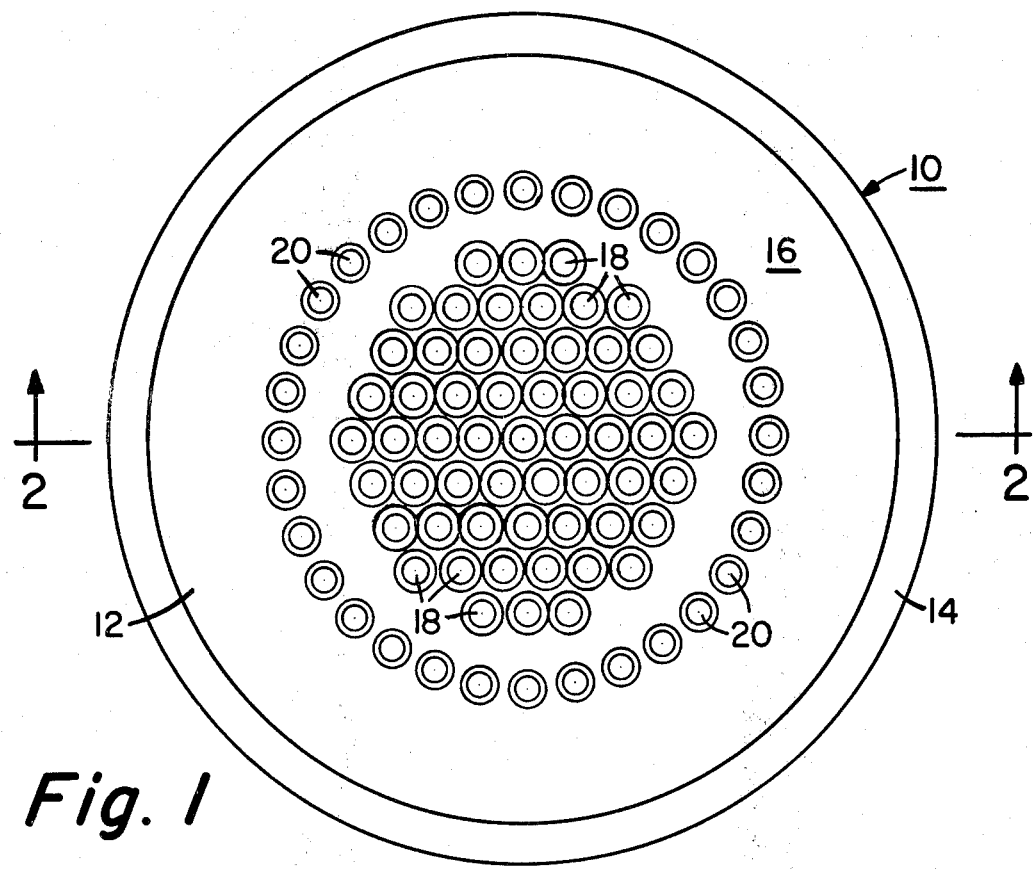
FIG. 1 is a top plan view of a die assembly embodying the present invention.

Referring now to the drawings, and particularly FIGS. 1 through 4 inclusive, a die assembly 10 is shown comprising a die body 12 and a collar 14. The die body has an inlet face 16 provided with a plurality of openings or feed passageways 18 for feeding batch material to the matrix of a honeycomb structure, as well as a plurality of annularly arranged feed passages 20 for feeding batch material to an outer casing or shell for such structure. If desired, a circular feed slot could be substituted for the feed passages 20, and the resulting central die portion held in position by suitable pins or the like.

Figure 3:
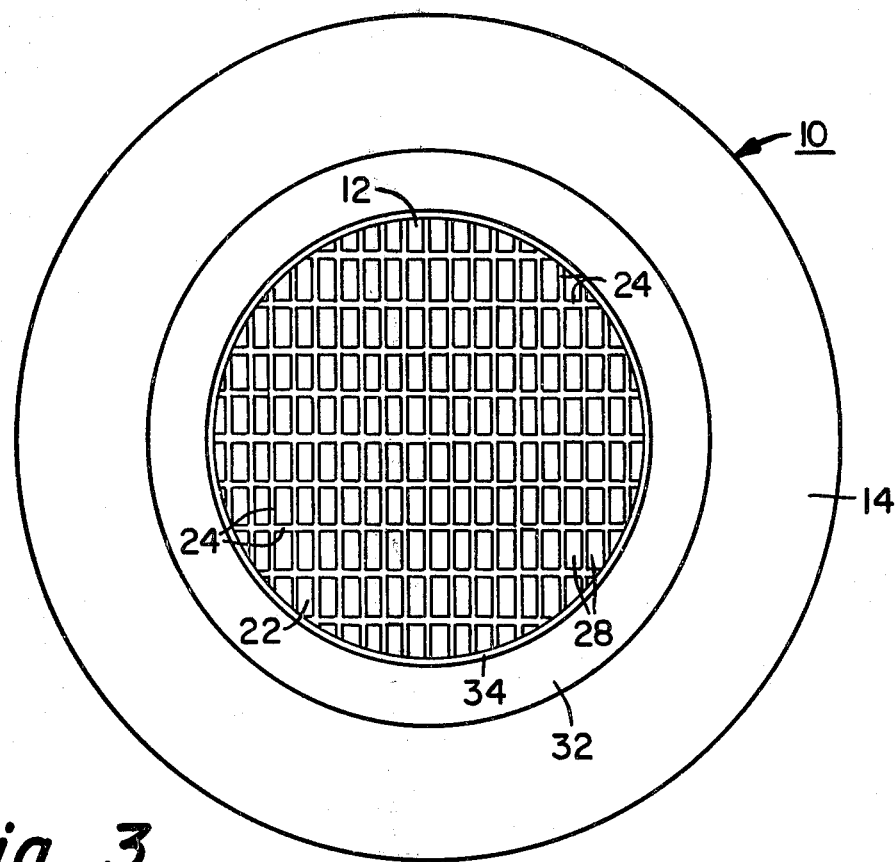
FIG. 3 is a bottom plan view of the die assembly shown in FIG. 1.
Figure 4:
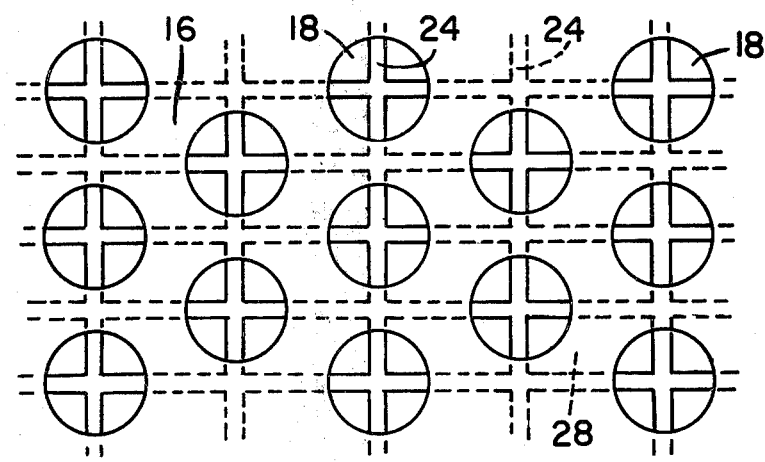
FIG. 4 is a greatly enlarged fragmental top plan view of the embodiment shown in FIG. 1 illustrating the orientation between the feed openings and discharge slots.

The die body 12 has an outlet face 22, opposite inlet face 16, which is provided with a plurality of interconnected discharge slots 24. As shown in FIG. 3, the interconnected discharge slots 24 form a gridwork through which the batch material is extruded to form the matrix of a coherent honeycomb structure. Each discharge slot 24 is provided with a root portion 26 at its inward most end, and the feed passageways 18 communicate with selected areas of such root portions. As shown in FIG. 4, the feed passageways 18 may be in the form of holes which communicate with alternate intersecting slots formed in the discharge gridwork, such that the feed holes intersect one set of diagonal corners of core pins 28 formed by the intersecting slots.

Figure 2:
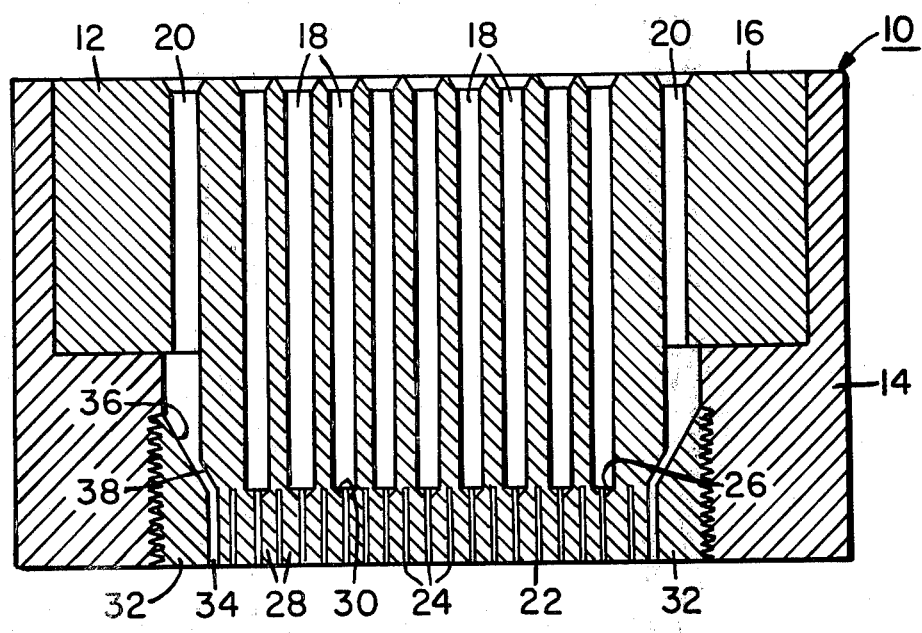
FIG. 2 is an elevational view in section taken along line 2—2 of FIG. 1.

As shown particularly in FIG. 2, the feed holes 18 have a taper 30 at their lower ends which intersect the root portions 26 of slots 24. The relatively large area of intersection as shown in FIG. 4 helps to provide for lateral flow within the slots between the intersections thereof with adjacent feed holes 18, so as to completely fill the lateral extent of the slots with batch material prior to the discharge thereof from the slots, even though a portion of the batch material directly below the feed holes longitudinally flows directly through such discharge slots. The discharge slots 24 extend inwardly a sufficient distance to insure the filling of at least the outlet end of the slots through lateral flow of the batch material prior to the discharge thereof from the gridwork formed by such slots. The resistance to batch flow necessary for encouraging lateral flow will of course not only be affected by the viscosity of the extrudable material, but also by the depth of the slots through which such material must travel during its obtainment of lateral flow. Preferably the resistance to batch flow in the slots should be at least equal to that in the feed holes, however, satisfactory results have been obtained by providing the slots with from about 0.8 to 6 times the resistance to flow through the feed passageways.

As shown particularly in FIG. 2, collar member 14 may have an adjustable insert 32 threadably attached thereto. The lower inner periphery of insert 32 forms an annular orifice 34 with the outer periphery of outlet face 22. Feed passages 20 supply batch material to the annular orifice 34 to provide an intergral casing or shell about the honeycomb matrix formed by the gridwork of discharge slots 24. The adjustable insert 32 has an upper tapered surface 36 which cooperates with outwardly tapered surface 38 formed on die body 12, to vary the resistance to the flow therebetween of batch being fed to the annular orifice 34. That, is, the resistance to the flow of batch material being delivered to the annular orifice 34 may be varied by threadably adjusting the position of insert 32 within collar 14. Not only do the tapered surfaces 36 and 38 provide a means for varying the resistance to flow, but also permit the annular ring of feed passages 20 to be outwardly offset and thereby permit the positionment of a full complement of feed passageways 18 for uniformly feeding batch material to the gridwork of interconnected slots 24.

Figure 5:
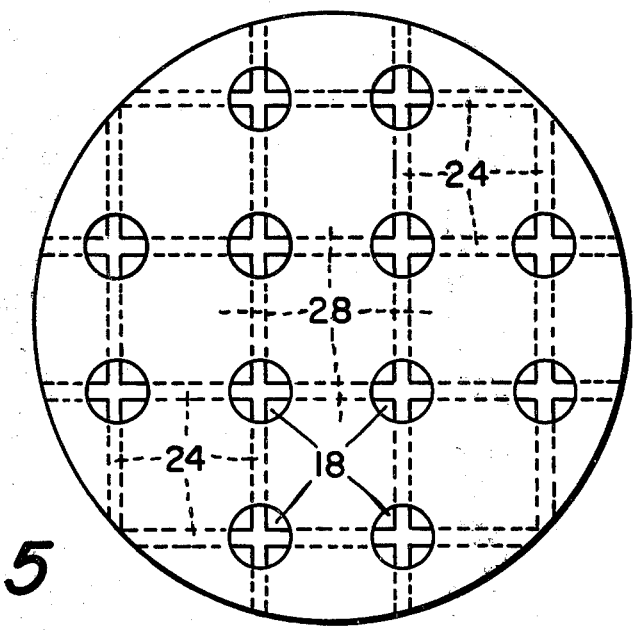
FIG. 5 is a top plan view of a further embodiment.

Although a rectangular gridwork is shown being formed by discharge slots 24 in FIGS. 3 and 4, the core pins 28 formed by slots 24 may be of a square configuration as shown in FIG. 5. Further, if desired each intersecting slot 24 may be provided with a feed hole 18 as shown in FIG. 5, rather than at every other intersection as shown in the embodiment of FIG. 4. The gridwork formed by the intersecting slots may be of virtually any desired pattern, including such geometric shapes as round, square, oblong, triangular, or hexangular. Honeycomb structures for use as heat exchangers, for instance, may be in the form of long thin passages formed by a plurality of thin parrallel walls having only periodic perpendicular webbing walls for maintaining the spacing between such parallel walls.

Figure 6:
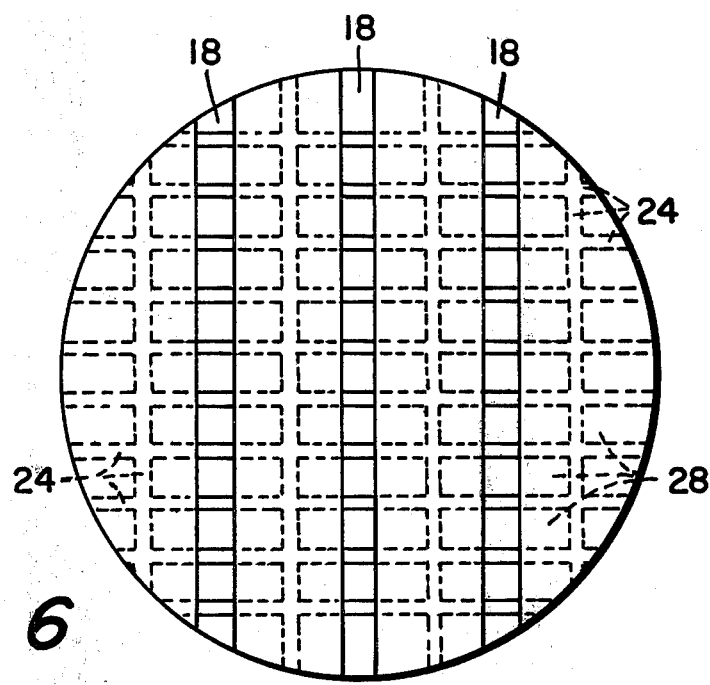
FIG. 6 is a top plan view of an additional embodiment.

As shown in the additional embodiment of FIG. 6, the discharge slots 24 may be fed by feed passageways 18 in the form of longitudinal slots, rather than by circular holes as shown in the embodiments of FIGS. 4 and 5. It will be apparent, however, that the feed slots 18 formed in the inlet face of the die body shown in FIG. 6 must be out of register with the discharge slots 24 formed in the outlet face, so that the base of the core pins 28 formed by the intersecting slots is not weakened excessively. Accordingly, it is felt that although feed slots may be utilized if desired, feed holes have an advantage over feed slots since a more rigid structure is usually obtained. As previously mentioned, the feed holes need only to be located such that the feed to the slots is uniform, since the extrudable material must flow laterally from the feed holes to completely fill the slots in the die prior to discharge from the outlet face.

Figures 7, 8, 9:
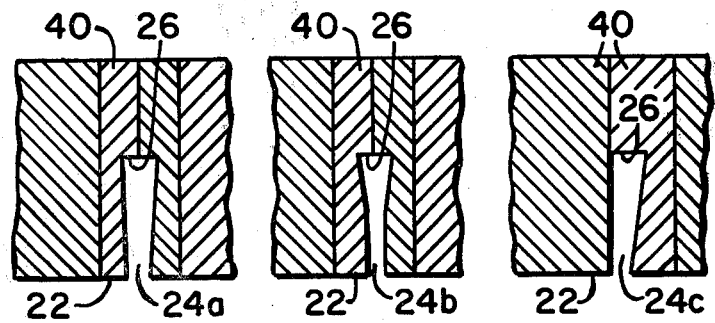
FIGS. 7, 8 and 9 are fragmental cross-sectional views in elevation illustrating various forms of discharge slots which may be utilized with the disclosed die structures.

Referring now to FIGS. 7, 8 and 9, various forms of slot configurations are shown which may be utilized with the die structures of the present invention. Although the various slot configurations may be formed in a unitary die block by applying conventional machining and cutting techniques, or through the use of electric discharge machining, the slots are illustrated as being formed in a plurality of sheets which may be individually machined, stacked together, and then formed into a unitary body such as by clamping, brazing, or diffusion bonding. Similarly, their associated feed holes may be formed either before or after bonding. Slot 24a, is shown in Fig. 7 as being equally formed in two opposing sheets 40, in such a manner so that the root portion 26 has a larger cross section than the same cross section of the discharge opening in outlet face 22, and the opposed sidewalls gradually taper inwardly from the root portion to the outlet face.

In a like manner, FIG. 8 illustrates a slot 24b being equally formed in opposing sheets 40 and having an enlarged root portion 26 as compared with the discharge opening in outlet face 22. However, the opposed sidewalls of the slot 24b initially taper inwardly from the root toward the outlet face but have a parallel section adjacent such outlet face. FIG. 9 illustrates a slot configuration 24c wherein one wall of the slot is formed by an uncut wall of a sheet 40 whereas the opposite wall is formed with a taper and is formed in an adjacent sheet 40. If desired, the slot 24c could be provided with a parallel opposing wall portion adjacent the outlet face 22. Further, any of the slots 24, 24a, 24b, or 24c or their associated feed holes could be formed within a unitary or laminated die body by means of chemical machining as disclosed in U.S. Pat. Nos. 2,628,160, 2,684,911, and 2,971,853. Such chemical machining would also be useful in forming a plurality of intersecting circular discharge slots.

The particular material utilized to produce the die body will of course be predicated upon the material to be extruded therethrough. The dies, for example, may be manufactured from machinable metals such as aluminum and cold rolled steel, or vitreous and ceramic materials such as glass ceramics, tungsten carbide and alumina. Although the utilization of slots having contoured roots for facilitating the lateral flow of batch material therewithin has been disclosed, it has been found that straight-sided slots 24 as shown in FIG. 2 are very adequate for extruding ceramic batch materials.

As will be noted in FIG. 3, some of the core pins 28 about the periphery of the outlet face 22 are of a reduced size due to the circular configuration of annular orifice 34. However, by shaping the outside casing produced by orifice 34 so that wall portions thereof are parallel to the slots formed in the outlet face, all of the core pins may then be formed of an equal size. For example, if the orifice 34 is formed with a square opening, and the outlet face is provided with a gridwork having a square slot pattern, all of the core pins may be of equal size. Further, if the orifice 34 is provided with a hexagonal opening and a triangular slot pattern is formed in the outlet face of the die, all of the core pins will be of equal size since the gridwork will coincide with the casing configuration.

Although the feed holes 18 are usually uniformly drilled within the die body to intersect with selected areas of the slots forming the discharge gridwork, the diameters of the various feed holes may be varied in selected areas to provide greater or less feed as may be necessary due to the particular configuration of the extruded cellular honeycomb article. Even though the utilization of longitudinally extending feed holes is preferred, it may be desirable to slant feed holes in the area of the collar in order to provide complete batch filling adjacent the casing. Further, although the invention is primarily useful in overcoming the problems of forming thin-walled honeycomb structures having from about 60 to 600 openings per square inch of cross sectional area, it should be appreciated that it may also be used in making thick walls if desired.

It will be readily apparent to those skilled in the art that the particular size and shape of individual orifices embodying the present invention will vary with the physical properties of the material being extruded, and although the present invention is not directed to extrudable batch materials per se, but rather to a method and apparatus for extruding honeycomb articles, the following specific example is given merely as being one illustration of the invention.

A 5 inch diameter die having an overall thickness of 1.2 inch was made from cold rolled steel and provided with a surrounding collar member. A gridwork of discharge slots was cut into the outlet face thereof with a width of 0.010 inches and a depth of 0.150 inches forming square core pins having a width of 0.065 inches. Feed holes having a diameter of 0.081 inches were drilled into the inlet face of the die to a depth of 1.05 inches so as to intersect the discharge slots adjacent every other intersection of the gridwork, thus producing 89 feed holes per square inch of cross-sectional area. The slots had a relative resistance to flow of about 4 times that produced by the feed holes. Also a circle of feed holes for the shell or outer casing were drilled with a diameter of 0.070 inches and a depth of 0.900 inches to form a total of 72 feed openings for feeding batch to the annular orifice formed between the die body and collar member.

A ceramic batch material comprising about 58 parts by weight of pulverized EPK Florida Kaolin, obtainable from Whittaker, Clark and Daniels of New York, N.Y., about 20 parts by weight of Texas white talc No. 2619, obtainable from Hammel & Gillespie, Inc. of White Plainfield, N. J., about 22 parts by weight of T-61 alumina produced by Aluminum Corp. of America, and about 28 parts by weight of water, with suitable extruding aids for bonding and plasticizing such as methyl cellulose, was fed to the die under a pressure of about 1900 psi at an extrusion rate of about 45 inches per minute. The batch material flowed longitudinally through the feed passages and was delivered to the interconnected discharge slots forming the square-patterned gridwork, whereupon a portion of the material flowed laterally within the gridwork to form a continuous grid-like mass therewithin. Batch was simultaneously fed to the annular orifice surrounding the grid-like mass, and then the interconnected mass was longitudinally discharged simultaneously from said slots and said orifice to form a honeycomb structure with an integral casing. The resulting structure had 179 openings per square inch with wall members therebetween of 0.010 inches, thus producing an open frontal area of about 75%. Both the cells and the bounding wall members were uniform throughout their cross-sectional and longitudinal extents. It will be appreciated, that after the ceramic structure was dried and fired, the resulting wall members had a thickness of even less than 0.010 inches thus resulting in a truly thin-walled honeycomb structure having both uniform wall portions and cells.

Although the now preferred embodiments of my invention have been disclosed, it will be apparent to those skilled in the art that various changes and modifications may be made thereto without departing from the spirit and scope thereof as defined in the appended claims.

What is claimed is:

1. Apparatus for forming honeycomb articles which comprises:
    A. a plurality of sheets of material each having opposed faces bounded by top and bottom edges;
    B. a plurality of said sheets each having a groove formed in one of said opposed faces, open to said bottom edge, and closed by the other of said opposed faces;
    C. additional grooves formed in said sheets open to said bottom edges and open at least to one of said opposed faces of such sheets;
    D. said sheets being stacked together to form a unitary extrusion die with adjacent faces of said stacked sheets lying parallel to the axis of extrusion of said die;
    E. said extrusion die having a die body provided with an inlet face and an outlet face;
    F. a plurality of feed passageways formed in said inlet face and extending longitudinally inwardly within said die body parallel to the axis of extrusion;
    G. said grooves open to said bottom edge of said sheets of material providing a plurality of interconnected dishcarge slots in said outlet face which extend inwardly along said adjacent faces into communication with inner ends of said longitudinal feed passageways; and
    H. said discharge slots having means for providing resistance to batch flow which is sufficient to insure that the batch material will flow laterally together within the depth of said discharge slots.

2. Apparatus for forming honeycomb articles as defined in claim 1 wherein the adjacent faces of a pair of stacked sheets of said material are each provided with one of said grooves which is open to said bottom edge and closed to its opposed face, and said grooves within said adjacent faces being juxtapositioned to complementally form a contoured discharge slot.

3. Apparatus for forming honeycomb articles as defined in claim 1 including:
    A. a unitary die formed from laminated sheets of material;
    B. said laminations extending substantially perpendicular to said inlet and outlet faces; and
    C. said plurality of feed passageways extending inwardly of the die body along said laminations to communicate with said discharge slots formed in the outlet face of said die body.

* * * * *